(12) United States Patent
Vollmer

(10) Patent No.: US 10,908,345 B2
(45) Date of Patent: Feb. 2, 2021

(54) LIGHTING DEVICE FOR VEHICLES

(71) Applicant: Hella GmbH & Co. KGaA, Lippstadt (DE)

(72) Inventor: Martin Vollmer, Erwitte (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 16/491,191

(22) PCT Filed: Mar. 7, 2017

(86) PCT No.: PCT/EP2017/055250
§ 371 (c)(1),
(2) Date: Sep. 5, 2019

(87) PCT Pub. No.: WO2018/162037
PCT Pub. Date: Sep. 13, 2018

(65) Prior Publication Data
US 2020/0012035 A1    Jan. 9, 2020

(51) Int. Cl.
*F21V 8/00* (2006.01)
*F21S 43/249* (2018.01)
(Continued)

(52) U.S. Cl.
CPC ............ *G02B 6/0046* (2013.01); *F21S 43/14* (2018.01); *F21S 43/239* (2018.01); *F21S 43/249* (2018.01);
(Continued)

(58) Field of Classification Search
CPC ..... G02B 6/0046; G02B 6/002; F21S 43/249; F21S 43/14; F21S 43/239; F21Y 2115/10;
(Continued)

(56) References Cited

U.S. PATENT DOCUMENTS

2014/0063847 A1    3/2014 Sakamoto et al.

FOREIGN PATENT DOCUMENTS

| DE | 102008048765 A1 | 3/2010 |
| DE | 102013226133 A1 | 6/2015 |

(Continued)

*Primary Examiner* — Andrew J Coughlin
*Assistant Examiner* — Jessica M Apenteng
(74) *Attorney, Agent, or Firm* — Husch Blackwell LLP

(57) ABSTRACT

A lighting device for vehicles is provided, having a flat light guide containing two flat sides facing each other, one light input coupling surface for the entry of light at a light input coupling side of the flat light guide, one light output coupling surface for the output of light input at the light input coupling surface with the light output coupling surface arranged at one light output coupling side of the flat light guide. A specified light distribution (L) is thereby generated. The flat light guide further includes one narrow lateral surface connecting the flat sides with each other and extending from one lateral border of the light output coupling side, one collection surface adjacent to the light input coupling surface shaped in such a manner that a partial light beam of the entering light striking the collection surface is reflected in total towards the light output coupling surface without the partial light beam striking the narrow lateral surface. The light output coupling surface featuring a number of protrusions and depressions is alternately arranged transverse to the main beam direction (H), with the protrusions featuring at least two lateral slopes tapered at an acute angle ($\alpha$) and a tip surface, that the tip surface is shaped in such a manner that a partial light beam which has been totally reflected from the collection surface and/or the flat sides and an additional partial light beam originating directly from the light input coupling surface are refracted at the tip surface to generate a central region (L1) of light distribution (L), that the lateral slope of the protrusion is shaped in such a manner that another partial light beam of the input light striking the (Continued)

lateral slope is totally reflected towards the tip surface and exits the flat light guide at the tip surface to generate a lateral region (L2, L3) of light distribution (L).

10 Claims, 4 Drawing Sheets

(51) Int. Cl.
    *F21S 43/14*     (2018.01)
    *F21S 43/239*     (2018.01)
    *F21Y 115/10*     (2016.01)
    *F21W 103/10*     (2018.01)
    *F21W 103/35*     (2018.01)
    *F21W 103/20*     (2018.01)
    *F21W 103/55*     (2018.01)

(52) U.S. Cl.
    CPC ......... *G02B 6/002* (2013.01); *F21W 2103/10* (2018.01); *F21W 2103/20* (2018.01); *F21W 2103/35* (2018.01); *F21W 2103/55* (2018.01); *F21Y 2115/10* (2016.08)

(58) Field of Classification Search
    CPC ........... F21W 2103/10; F21W 2103/35; F21W 2103/20; F21W 2103/55
    USPC .......................................................... 362/511
    See application file for complete search history.

(56) References Cited

FOREIGN PATENT DOCUMENTS

| | | | |
|---|---|---|---|
| DE | 102014102496 A1 | 8/2015 | |
| EP | 2363738 A2 * | 9/2011 | ............ F21S 43/14 |
| EP | 2363738 A2 | 9/2011 | |
| EP | 2818791 A1 | 12/2014 | |
| JP | 2015201278 A | 11/2015 | |

* cited by examiner

LIGHTING DEVICE FOR VEHICLES

CROSS REFERENCE

This application claims priority to PCT Application No. PCT/EP2017/055250, filed 7 Mar. 2017, the entirety of which is hereby incorporated by reference.

FIELD OF THE INVENTION

The invention concerns a lighting device for vehicles with a flat light guide containing two flat sides facing each other, one light input coupling surface for the entry of light at a light input coupling side of the flat light guide, one light output coupling surface for the output of light input at the light input coupling surface with the light output coupling surface arranged at one light output coupling side of the flat light guide in such a manner that a specified light distribution is generated, one narrow lateral surface connecting the flat sides with each other and extending from one lateral border of the light output coupling side, one collection surface adjacent to the light input coupling surface shaped in such a manner that a partial light beam of the entering light striking the collection surface is reflected in total towards the light output coupling surface without the partial light beam striking the narrow lateral surface.

BACKGROUND

Under DE 10 2014 102 496 A1 a lighting device for vehicles is known, featuring a flat light guide to generate a specified light distribution. The flat light guide is disk-shaped, with flat sides facing each other, one light input coupling surface for the entry of light at one light input coupling side of the flat light guide and one light output coupling surface to output the light at the light output coupling side of the flat light guide. The flat sides are connected with each other at opposite borders via narrow lateral surfaces. Adjacent to the light input coupling surface is a collection surface by which part of the input light is reflected in total in the direction of the light output coupling surface without the partial light beam striking the narrow lateral surface. Advantageously, the input light is bundled by the collection surface and provided with a controlled light guidance towards the light output coupling surface. The light output coupling surface features a multitude of cushion-shaped scattering elements by which the light is deflected in order to generate the specified light distribution. Due to the comparatively flat scattering elements, the scatter effect is limited, particularly in the direction of extension of the flat light guide.

SUMMARY OF THE INVENTION

The task of this invention is thus to enhance a lighting device for vehicles with a flat light guide in such a manner, that light entering the flat light guide at certain points is bundled and radiated at a light output coupling side of the flat light guide homogenously under a comparatively large scattering angle.

To solve this task, the light output coupling surface features a number of protrusions and depressions arranged alternately in transverse to the main beam direction, with the protrusions featuring at least two lateral slopes tapered at an acute angle and one tip surface, that the tip surface is shaped in such a manner that a partial light beam which has been totally reflected from the collection surface and/or the flat sides and an additional partial light beam originating directly from the light input coupling surface are refracted at the tip surface to generate a central region of light distribution, that the lateral slope of the protrusion is shaped in such a manner that another partial light beam of the input light striking the lateral slope is totally reflected towards the tip surface and exits the flat light guide at the tip surface to generate a lateral region of light distribution.

According to the invention, one light output coupling surface of the light guide is contoured, featuring a number of protrusions and depressions alternately arranged in the direction of extension of the flat light guide. The protrusion features a lateral slope rising from the neighbouring depression and a tip surface at the top. The tip surface is shaped in such a manner that a partial light beam totally reflected from the collection surface and/or a flat side and an additional partial light beam originating directly from the light input coupling surface are refracted at the tip surface to generate a central region of light distribution. The lateral slope of the protrusion is shaped in such a manner that an additional partial light beam of the input light striking the lateral slope is totally reflected towards the tip surface, in order to exit at the tip surface under a comparatively large angle to the main beam direction so that a lateral region of light distribution is generated. While the central region of light distribution comprises a horizontal angle range of +/−40° a lateral region neighbouring the central region on the left and right side is generated by partial light beams which are totally reflected at the lateral slope of the protrusion. The lateral region may comprise a horizontal angle range of 20° to 40° or −20° to −40°. Advantageously, the invention enables the creation of a homogenous distribution of light without interfering stripes enabling in particular a comparatively large horizontal scatter.

According to one preferred embodiment of the invention, the lateral slope of the protrusion is located in transverse in such an inclination towards a plane of extension of the flat light guide and to a plane of reference of the flat light guide running in the main beam direction and/or the tip surface is curved in such a manner that the partial light beam totally reflected at the lateral slope exits the tip surface unrefracted and/or at a small refraction angle of up to 3°. Advantageously, the entire luminous flux striking the lateral slope is thus used for light distribution, because this luminous flux is guided to the tip surface of the protrusion, so that the corresponding partial light beam is emitted towards the side at a comparatively steep angle. Advantageously, this enables the creation of a comparatively wide light distribution without interfering stripes.

According to an enhancement of the invention, the depression of the light output coupling surface has a convex shape so that a partial light beam refracted at the depression is, with the light beams of this beam crossing each other, radiated into an area between the lateral slopes of the protrusion, in order to create the central region of light distribution. Due to the convex bottom area of the depression and/or the widening of the depression in the main beam direction, the light can be refracted from the bottom area without any entry and/or total refection of light occurring at the lateral slopes of the protrusion bordering the depression. Advantageously, this enables the provision of a luminous flux for the creation of the central region of light distribution.

According to an enhancement of the invention, the tip surface of the protrusion has a concave shape and the bottom area of the depression has a convex shape. Due to the concave design of the tip surface, the partial light beam not striking the lateral slope before is radiated at a comparatively large scattering angle. Due to the convex design of the bottom area of the depression, the partial light beam striking it is radiated at a comparatively small scattering angle so that it can contribute to the light distribution in the central region.

According to an enhancement of the invention, the protrusion of the light output coupling surface is shaped like a bar. The lateral slopes of the protrusion extend in a tapered shape towards the tip of the protrusion. The tapering of the lateral slopes depends on a critical angle of total reflection. The taper of the lateral slopes is preferably chosen so that more or less the entire partial light beam totally reflected at the lateral slope passes through the tip surface of the protrusion. If the taper was too large, i. e. when an angle of incidence of the lateral slope was comparatively large, then an unwanted light emission from the lateral slope would occur. If the taper was too steep, and/or the angle of incidence too small, then only part of the tip surface would be covered by the partial light beam reflected at the lateral slope.

According to an enhancement of the invention, the lateral slope of the protrusion features an angle of incidence in the range of 10° to 20°, preferably 15° to 20°. Advantageously, this allows that the entire partial light beam striking the lateral slope is reflected to the tip surface of the protrusion, thus permitting a homogenous illumination of lateral regions of light distribution.

According to an enhancement of the invention, a clearance between neighbouring protrusions is larger than any width of the protrusions and/or any height of the protrusions. Advantageously, this allows to use the space between the lateral slopes which is formed by the depression to illuminate the central region of light distribution.

According to an enhancement of the invention the protrusions have a length running in transverse to the plane of extension which is more than double in size than the width of the protrusions. Advantageously, a comparatively long bar is formed due to this which provides for a comparatively wide light distribution in the direction of extension of the flat light guide. If the flat light guide is arranged horizontally, this allows to generate a comparatively wide horizontal scatter.

According to an enhancement of the invention, the protrusions and or depressions have the same design, with one protrusion and one depression each forming one light output coupling segment. Each light output coupling segment generates the same light distribution. Advantageously, this allows scalability of the width of light distribution. It furthermore enables a larger variability regarding the use of light sources. For example, the flat light guide can have a compact design with a small width, when comparatively few high-power LED light sources are used, whilst the flat light guide must be wider when several low-power LED light sources are used.

According to an enhancement of the invention, the light output coupling segments are arranged in tiers in the direction of the plane of extension of the flat light guide. Advantageously, this allows to create an increased lateral radiation angle in the direction of the extension of the flat light guide. Preferably, the increased lateral beam direction is used in back-up lights for the radiation of light towards the outer side of the vehicle whilst the smaller lateral radiation is oriented towards the inner side of the vehicle.

According to an enhancement of the invention, one light source each is allocated to the light input coupling surface of the flat light guide. Preferably, the light source is located in the vicinity of the light input coupling surface so that the light can be input directly from the light source into the flat light guide. Alternatively, it is also possible that the light is input indirectly, by means of another light guide or a similar device, into the light input coupling surface of the flat light guide.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The lighting device essentially features a flat light guide 1 and a multitude of light sources 2, which are arranged on the light input coupling side 3 of the flat light guide 1. The light sources 2 are designed as semiconductor-based light sources, preferably LED light sources.

The rear light shown in the figures is designed as a rear light located on the left side in relation to a longitudinal axis of the vehicle, featuring a slanted surface 4 facing the inner side of the vehicle. The lighting device and/or the flat light guide 1 extend essentially in horizontal direction. Plane of extension E of flat light guide 1 thus runs in horizontal direction.

Figure 6:
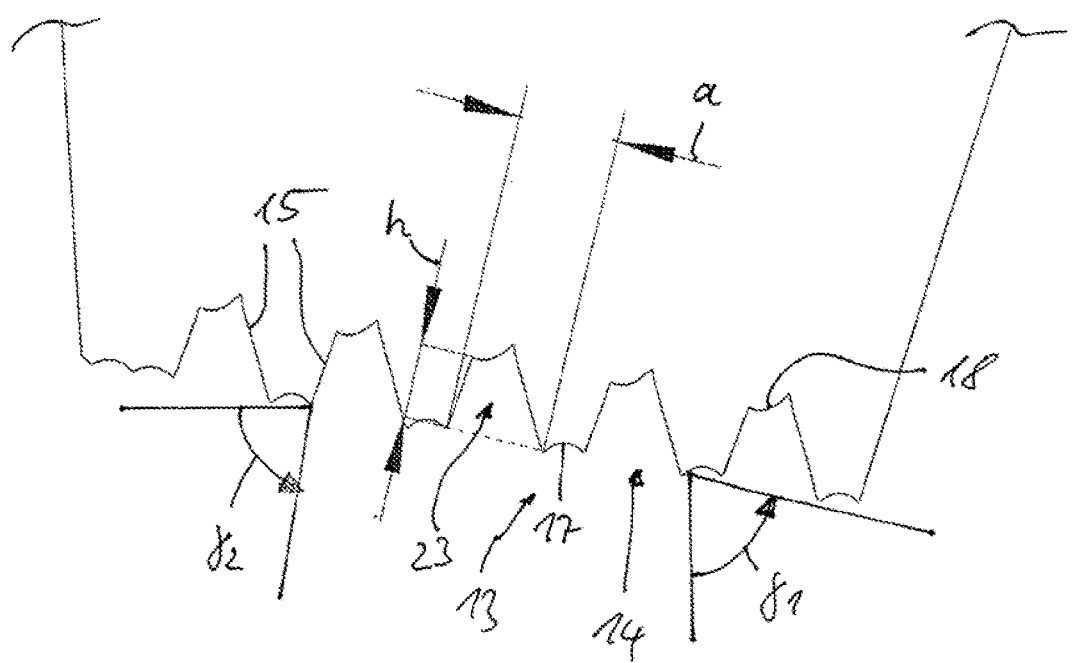
FIG. 6 is an enlarged longitudinal section view of the flat light guide on the light output coupling side.
Figure 7:
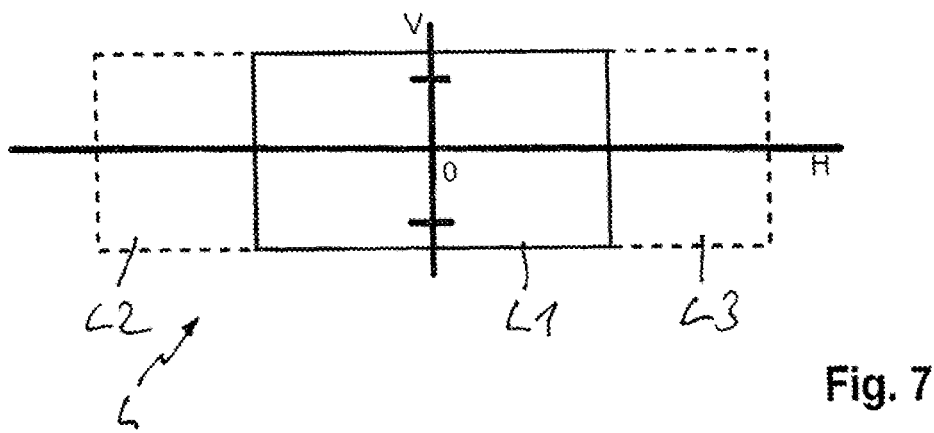
FIG. 7 is a schematic diagram of the light distribution of the lighting device A lighting device for vehicles according to the invention can be applied in the front or rear area of the vehicle to generate a light function, e.g. tail light/brake light, turning light or a daytime running light function. In the example for an embodiment described here, the lighting device is designed as rear light.

The flat light guide 1 features opposing flat sides 5 which have a level shape in the example for an embodiment described here. On a front side facing in the main beam direction H of the lighting device or a light output coupling side 6, a light output coupling surface 7 is located, at which light input into the flat light guide 1 is emitted or output in order to generate the specified light distribution. L; refer to FIG. 6. The light output coupling surface 7 borders the flat sides 5 at the light output coupling side 6 in the front of the flat light guide 1.

Facing in the main beam direction H, the flat light guide 1, at the rear side of the light input coupling side 3, features a multitude of light input coupling surfaces 8 located at intervals transversely to the main beam direction H, each of which is neighboured by a collection surface 9. The collection surface 9 is shaped as parabola or free-form surface in such a manner that a partial light beam of the input light striking collection surface 9 is totally reflected in the direction of the light output coupling surface 7. The input light is thus essentially parallelized by means of the collection surface 9, in the direction of the main beam direction H.

The flat light guide 1 furthermore features a narrow lateral surface 10, extending from a lateral border 11 of light output coupling side 6 and essentially oriented in the opposite direction of the main beam direction H. The narrow lateral surface 10 extends into a rear area of the flat light guide 1, on which level the front end of collection surface 9 ends.

While the flat sides 5 are designed as large surfaces, the light output coupling surface 7, the light input coupling surface 8 as well as the narrow lateral surface 10 has a narrow design.

In the example for an embodiment described here, only two collection surfaces 9 and two light input coupling surfaces 8 are provided, with the light sources 2 allocated to the light input coupling surfaces 8.

The light output coupling surface 7 consists of a multitude of light output coupling segments 12, each featuring one protrusion 13 and one depression 14. In the example for an embodiment described here, five light output coupling segments 12 are provided, arranged side by side and in tiers on a horizontal plane. The tiering of the light output coupling segments 12 starts from one initial narrow lateral surface 10', which is located on a side facing the outer side of the vehicle and proceeds towards the front up to an opposite, second narrow lateral surface 10", which is facing the inner side of the vehicle. The light output coupling surface 7 is thus arrow-shaped, forming a sweep position φ.

The protrusions 13 feature lateral slopes 15 on both sides of a plane of reference B, which is perpendicular to a plane of extension E and preferably also in the main beam direction H and they also feature a tip surface 17 located at the front tip. The depression 14 is primarily formed by a bottom area 18 from which the lateral slopes 15 of the neighbouring protrusions 13 rise. The light output coupling surface 7 thus features a profiled design, with the tip surfaces 17 located in the main beam direction H in front of the bottom area 18.

In the example for an embodiment described here, the protrusions 13 are shaped like a bar, with length l of the protrusions 13 more than double in size than width b of the tip surface 17. Width b of the tip surface 17 is smaller than a clearance a between the tip surfaces 17 of neighbouring protrusions 13. Height h of the protrusions 13 is smaller than clearance a between the tip surfaces 17 of neighbouring protrusions 13. In the example for an embodiment described here, clearance a ranges between 4 mm and 8 mm, preferably 6 mm. Depth t of the protrusions 13 ranges between 2.5 mm and 6.5 mm, preferably 4.5 mm.

Figure 1:
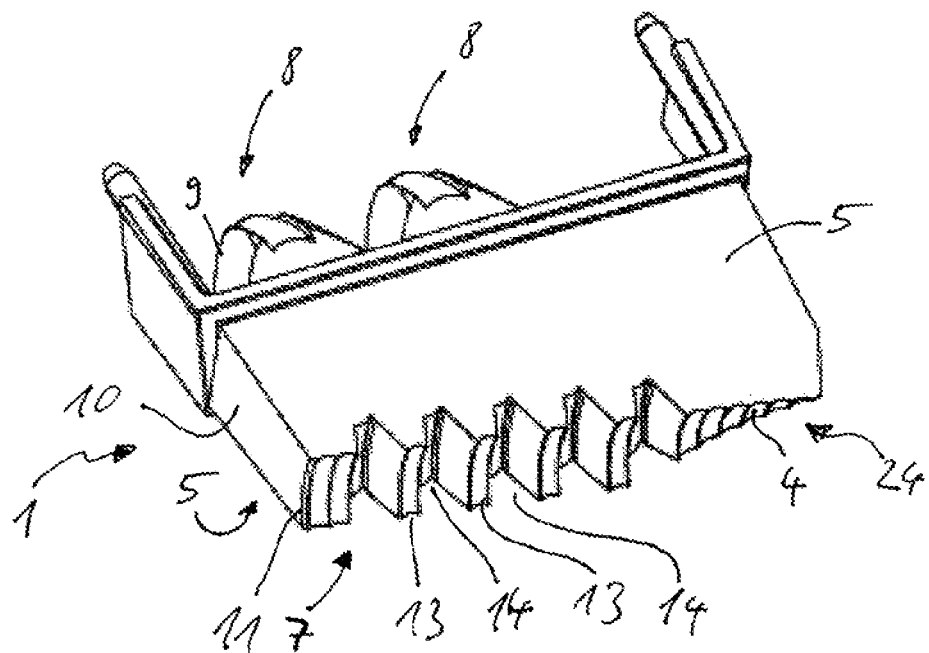
FIG. 1 is a perspective front view of a lighting device according to the invention.
Figure 2:
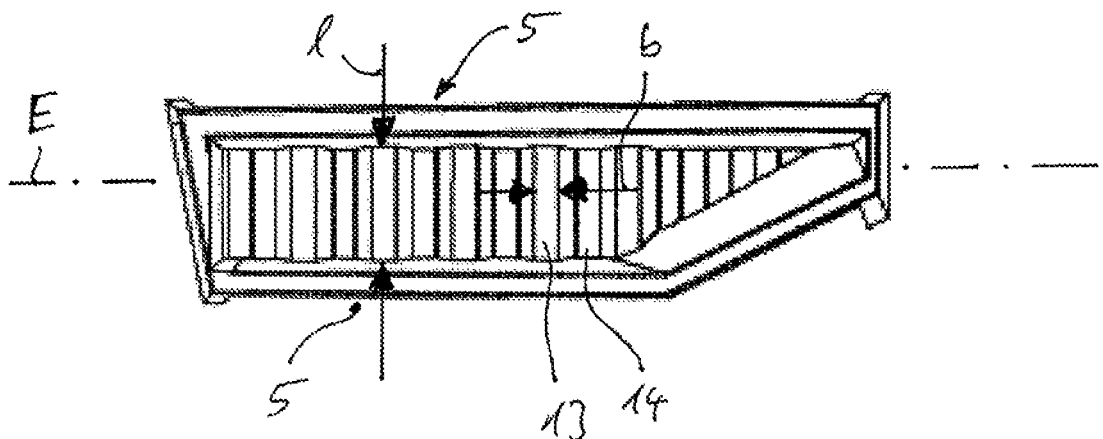
FIG. 2 is a front view of the lighting device.
Figure 3:
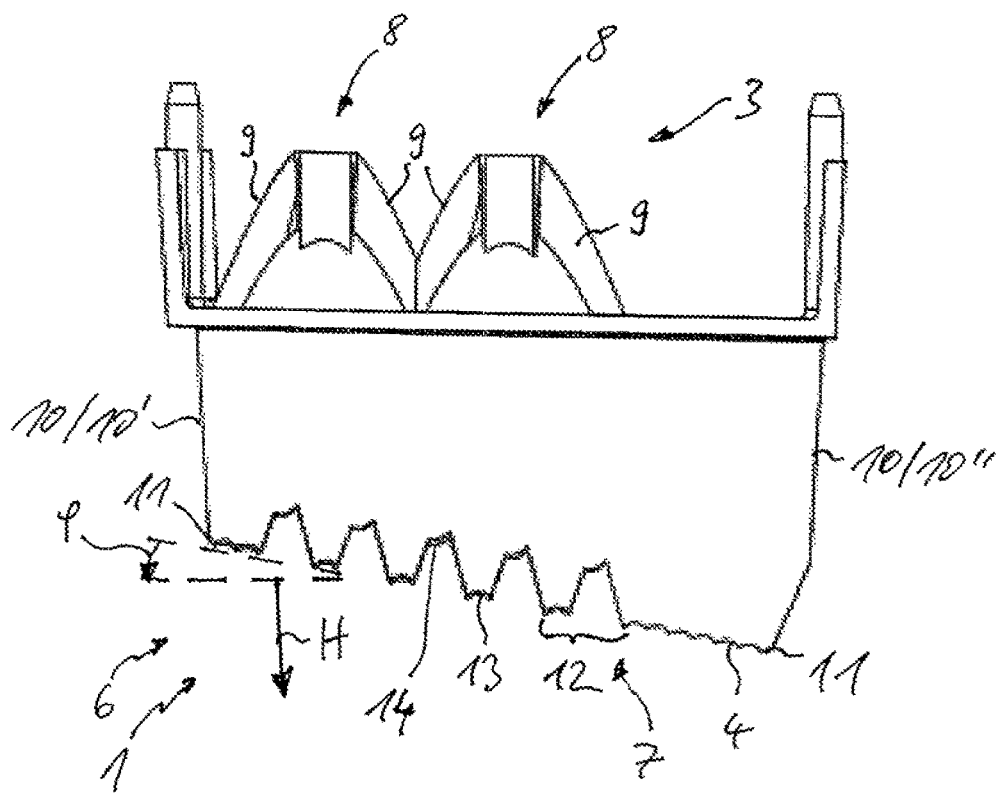
FIG. 3 is a top view of a flat light guide of the lighting device.
Figure 4:
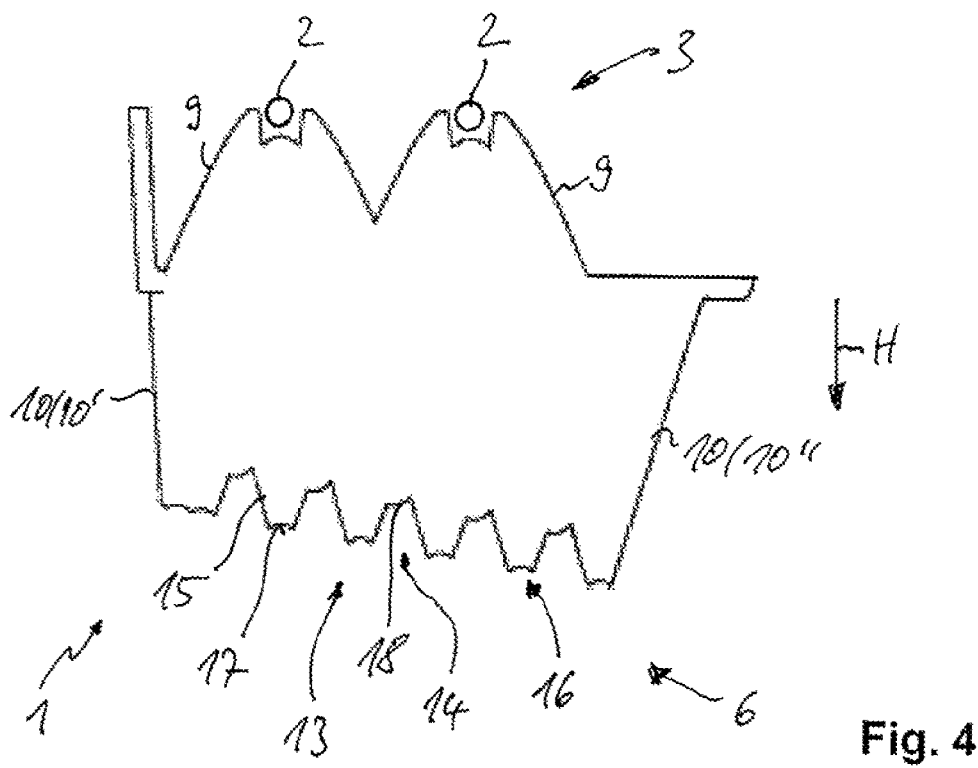
FIG. 4 is a longitudinal section and/or a section along a plane of extension of the flat light guide.
Figure 5:
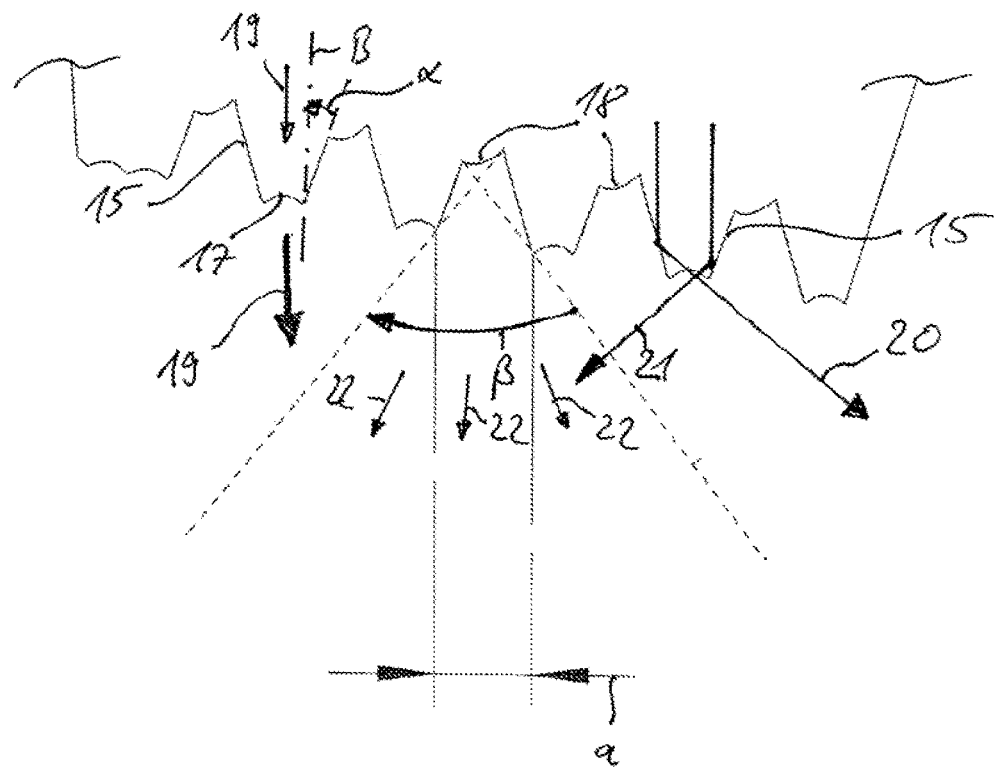
FIG. 5 is an enlarged longitudinal section view of the flat light guide on a light output coupling side.

The flat light guide (1) features a thickness which is determined by the distance between the parallel flat sides (5). The thickness essentially corresponds to length (l) of the tip surface (17) or the bottom area (18). Only in an optically ineffective corner area (24), where the slanted surface (4) is realised, the flat light guide (1) exhibits a decreased thickness.

tip surface 17 of protrusion 13 is shaped concavely or curved inwards in such a manner that a partial light beam totally reflected from collection surface 9 and/or the flat side 5 and another partial light beam directly originating from the light input coupling surface 8 are refracted at the tip surface 17 to generate a central region L1 of the light distribution L shown in FIG. 5. In FIG. 5, these partial light beams are schematically labelled with reference number 19.

The lateral slopes 15 of protrusion 13 are shaped with such a slant towards the plane of reference B that a partial light beam of the input light striking them is totally reflected towards tip surface 17 of the same protrusion 13 in order to exit the flat light guide 1 at this point to generate the lateral regions L2 and L3 of light distribution L. A partial light beam, refer to arrow 20, which is totally reflected at the lateral surface 15 of protrusion 13 facing the outer side of the vehicle, exits at the tip surface 17 towards the inner side of the vehicle and thus contributes towards the creation of a second lateral region L2. A partial light beam, refer to arrow 21, which is totally reflected at the lateral slope 15 of protrusion 13 facing the inner side of the vehicle, exits at the tip surface 17 towards the outer side of the vehicle and thus contributes towards the creation of an additional lateral region L3. It should be noted that the partial light beams 20, 21 are output from tip surface 17 more or less unrefracted, i.e. not refracted and/or refracted at a small refraction angle of up to 3°. Furthermore, the lateral slopes 15 are slanted in such a manner that the entire partial light beam 20, 21 striking them is deflected towards tip surface 17 of protrusion 13 so that the losses in luminous flux are comparatively low. The lateral slopes 15 exhibit an angle of inclination or angle of incidence a in the range of 10° to 20°, preferably 15° to 20°. The inclination of the lateral slopes 15 is chosen so that the entire partial light beam arriving from the main beam direction H and striking the lateral slopes 15 is reflected in total.

The bottom area 18 of depression 15 is curved outwards or designed in a convex shape so that a partial light beam 22 striking this area is radiated in an angle of beam spread β to generate the central region L1 of light distribution L. The angle of beam spread β ranges from 70° to 85°, so that a central region L1 of +/−40° can be illuminated. The partial light beam 22 exits the bottom area 18 in such a manner that it continues in a space (23) between neighbouring protrusions 13, with the light beams 22' of this beam crossing each other.

Due to the convex shape of the bottom area 18, the partial light beam 22 is output in a smaller angle of beam spread β than the partial light beam which is not reflected at the lateral slope and which is output at the tip surface 17. The partial light beam 19 thus generates a larger horizontal section of light distribution L than the partial light beam 22. The partial light beams 20, 21 reflected at the lateral slopes 15 exit in a comparatively large exit angle $\gamma_1$, $\gamma_2$, which may extend up to a lateral radiation in the direction of the extension E of 80° or 89°. This essentially creates the lateral regions L2, L3 of light distribution.

The invention enables a homogenous, wide light distribution L. To enable that the light distribution L also extends in vertical direction in a range of +/−15°, the tip surface 17 and the bottom area 18 are curved inwards and outwards respectively, in a direction running vertical to the plane of extension E and vertical to the main beam direction H.

LIST OF REFERENCE NUMERALS

1 Flat light guide
2 Light source
3 Light input coupling side
4 Slanted surface
5 Flat side
6 Light output coupling side
7 Light output coupling surface
8 Light input coupling surface
9 Collection surface
10,10',10" Narrow lateral surface
11 Lateral border
12 Light output coupling segment
13 Protrusion
14 Depression
15 Lateral slope 16 Tip
17 Tip surface
18 Bottom area
19 Partial light beam
20 Partial light beam
21 Partial light beam
22 Partial light beam/rays of light
23 Space
24 Corner area
E Plane of extension
H Main beam direction
a Distance
b Width
B Plane of reference
d Thickness
l Length
L Light distribution
L2,L3 Lateral regions
h Height
t Depth
$\gamma_1, \gamma_2$ Exit angle
$\varphi$ Sweep position
$\beta$ Angle of beam spread
$\alpha$ Angle of incidence

The invention claimed is:

1. A lighting device for vehicles having a flat light guide, the flat light guide comprising:
two opposing flat sides,
one light input coupling surface for the entry of light at a light input coupling side of the flat light guide,
one light output coupling surface for emitting the light entering at the light input coupling surface, wherein the light output coupling surface is located at a light output coupling side of the flat light guide in order to generate a specified light distribution (L),
one narrow lateral surface connecting the flat sides with each other and extending from one lateral border of the light output coupling side,
one collection surface adjacent to the light input coupling surface, shaped in such a manner that a partial light beam of the entering light striking the collection surface is reflected in total towards the light output coupling surface without the partial light beam striking the narrow lateral surface
wherein the light output coupling surface features a number of protrusions and depressions alternately arranged in transverse to the main beam direction (H), with the protrusions featuring at least two lateral slopes tapered at an acute angle ($\alpha$) and one tip surface;
wherein the tip surface is curved inwardly in such a manner that a partial light beam which is totally reflected from the collection surface and/or the flat sides and an additional partial light beam originating directly from the light input coupling surface are refracted at the tip surface to generate a central region (L1) of light distribution (L);
wherein the lateral slope of the protrusion is shaped in such a manner that another partial light beam of the input light striking the lateral slope is totally reflected towards the tip surface and exits the flat light guide at the tip surface to generate a lateral region (L2, L3) of light distribution (L).

2. The lighting device according to claim 1, wherein the lateral slope is located in such an inclination towards a plane of reference (B) running in transverse to the plane of extension (E) of the flat light guide and in the main beam direction (H) and/or that the tip surface is curved in such a manner that the partial light beam totally reflected at the lateral slope exits the tip surface unrefracted and/or at a small refraction angle of up to 3°.

3. The lighting device according to claim 1 wherein the depression features a convex bottom area such that a partial light beam refracted at the bottom area is, while intersecting light rays of the same in a space between the lateral slopes of the neighbouring protrusions, is radiated in order to generate the central region (L1) of light distribution (L), while the rays of light do not strike the lateral slope.

4. The lighting device according to claim 1 wherein the bottom area of the depression is shaped convexly, with a curvature running in the plane of extension (E) being larger than a curvature running in perpendicular to the plane of extension (E).

5. The lighting device according to claim 1 wherein the protrusion is shaped like a bar and that the lateral slopes are tapered towards a tip of the protrusion thus embracing an acute angle of incidence (a) with the plane of reference (B) running in perpendicular to the plane of extension (E) in such a manner that the light beams totally reflected at the lateral slopes to the largest part exclusively strike the entire tip surface.

6. The lighting device according to claim 5 wherein the lateral slope under the angle of incidence (a) in the range of 10° to 20° preferably runs in the range of 15° to 20°.

7. The lighting device according to claim 1 wherein a clearance (a) between neighbouring protrusions is larger than any width (b) of the protrusions and/or any height (h) of the protrusions.

8. The lighting device according to claim 1 wherein the protrusions have a length (1) running in transverse to the plane of extension (E) which is more than double in size than the width (b) of the same.

9. The lighting device according to claim 1 wherein the protrusions and/or depressions have the same shape, with several light output coupling segments each consisting of one protrusion and one depression being provided, and that the light output coupling segments are arranged in tiers in the direction of the plane of extension (E).

10. The lighting device according to claim 1 wherein one light source is allocated to the light input coupling surface of the flat light guide.

* * * * *